US010565904B2

(12) United States Patent
Hu et al.

(10) Patent No.: US 10,565,904 B2
(45) Date of Patent: Feb. 18, 2020

(54) SPLICING SCREEN, METHOD AND DEVICE FOR DRIVING THE SAME, AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Weihao Hu, Beijing (CN); Xue Dong, Beijing (CN); Liang Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/770,906

(22) PCT Filed: Aug. 2, 2017

(86) PCT No.: PCT/CN2017/095648
§ 371 (c)(1),
(2) Date: Apr. 25, 2018

(87) PCT Pub. No.: WO2018/059115
PCT Pub. Date: Apr. 5, 2018

(65) Prior Publication Data
US 2018/0315355 A1 Nov. 1, 2018

(30) Foreign Application Priority Data
Sep. 27, 2016 (CN) .......................... 2016 1 0855576

(51) Int. Cl.
*G06F 9/302* (2018.01)
*G09G 3/3208* (2016.01)
(Continued)

(52) U.S. Cl.
CPC .......... *G09F 9/3023* (2013.01); *G09F 9/3026* (2013.01); *G09F 9/33* (2013.01); *G09G 3/3208* (2013.01)

(58) Field of Classification Search
CPC ...... G09G 9/3023; G09G 9/33; G09G 9/3026; G09G 3/34; G09G 3/32; G09G 3/3208; G09G 2300/026; G09G 2300/023
See application file for complete search history.

(56) References Cited

U.S. PATENT DOCUMENTS 6,314,669 B1 11/2001 Tucker
2010/0267423 A1* 10/2010 Yamakita .............. G06F 3/0238 455/566
2012/0001830 A1 1/2012 Xia et al.

FOREIGN PATENT DOCUMENTS

CN 201374154 Y 12/2009
CN 102262842 A 11/2011
(Continued)

OTHER PUBLICATIONS

First Office Action, including Search Report, for Chinese Patent Application No. 201610855576.5, dated Sep. 4, 2018, 32 pages.
(Continued)

*Primary Examiner* — Alexander Eisen
*Assistant Examiner* — Kebede T Teshome
(74) *Attorney, Agent, or Firm* — Westman, Champlin & Koehler, P.A.

(57) ABSTRACT

A splicing screen, a method and a device for driving the splicing screen and a display apparatus are provided. The splicing screen includes at least one main display region configured to display a first portion of a display image, and a frame display region at edges of the main display region and configured to display a second portion of the display image other than the first portion. The method includes calculating a division manner for a display image; and displaying different portions of the image correspondingly on the main display region and the frame display region according to the division manner. The device for driving the
(Continued)

splicing screen includes an image capture module and an image division display module.

18 Claims, 4 Drawing Sheets

(51) Int. Cl.
*G09F 9/33* (2006.01)
*G09F 9/302* (2006.01)

(56) References Cited

FOREIGN PATENT DOCUMENTS

| | | | | |
|---|---|---|---|---|
| CN | 103065551 | A | | 4/2013 |
| CN | 203300153 | U | | 11/2013 |
| CN | 104157216 | A | | 11/2014 |
| CN | 104299519 | A | | 1/2015 |
| CN | 104851373 | A | * | 8/2015 |
| CN | 104851373 | A | | 8/2015 |
| CN | 104900167 | A | | 9/2015 |
| CN | 106373493 | A | | 2/2017 |
| KR | 10-2015-0011581 | A | | 2/2015 |

OTHER PUBLICATIONS

International Search Report and Written Opinion, including English translation of Box V of the Written Opinion, for International Application No. PCT/CN2017/095648, dated Nov. 8, 2017, 13 pages.

* cited by examiner

SPLICING SCREEN, METHOD AND DEVICE FOR DRIVING THE SAME, AND DISPLAY APPARATUS

CROSS-REFERENCE TO RELATED APPLICATION

This application is a U.S. national phase application of PCT Application No. PCT/CN2017/095648, filed on Aug. 2, 2017, which claims priority to Chinese Patent Application No. 201610855576.5, filed on Sep. 27, 2016, the disclosures of which are incorporated in their entirety by reference herein.

TECHNICAL FIELD

The present disclosure relates to a field of display, and, in particular, to a splicing screen, a method for driving the splicing screen, a device for driving the splicing screen, and a display apparatus including the splicing screen and the device for driving the splicing screen.

BACKGROUND

With development of technology, a display technology has also made a substantial progress. A splicing screen is a newly developed display technology in recent years. A complete system with the splicing screen in the related art is a 2×2 splicing complete system, and includes two horizontal liquid crystal modules and two vertical liquid crystal modules. Since each of the liquid crystal modules inevitably includes a non-display region for driving-wires and the like, a splicing gap region incapable of displaying an image occurs inevitably after the liquid crystal modules are assembled into the complete system.

SUMMARY

The present disclosure provides a splicing screen, a method and a device for driving the splicing screen and a display apparatus including the splicing screen and the device for driving the splicing screen, so as to improve display quality of splicing display.

In a first aspect, the present disclosure provides a splicing screen. The splicing screen includes: a plurality of main display regions configured to display a first portion of a display image; and a frame display region at an edge of the main display regions and at splicing gaps between adjacent ones of the plurality of main display regions. The frame display region is configured to display a second portion of the display image other than the first portion of the display image.

Optionally, the frame display region includes a transparent frame and an electroluminescent layer on a light-emission side of the transparent frame.

Optionally, each of the main display regions includes a backlight module and a display panel arranged on a light-emission side of the backlight module, and the backlight module is a straight-down-type backlight module.

Optionally, the electroluminescent layer is a flexible organic light-emitting diode OLED layer or a flexible light-emitting diode LED layer.

Optionally, the electroluminescent layer is adhered to the transparent frame by means of a transparent glue.

Optionally, the frame display region further includes an electronic paper display EPD between the transparent frame and the electroluminescent layer, and the electroluminescent layer is transparent such that the electronic paper display is capable of displaying through the electroluminescent layer.

Optionally, in a case that the splicing screen displays at least one of a black-and-white image and a static image, the EPD is used for display; and in a case that the splicing screen displays an image other than the black-and-white image and the static image, the electroluminescent layer is used for display.

In a second aspect, the present disclosure provides a method for driving a splicing screen, the method is used to drive the above-mentioned splicing screen. The method for driving a splicing screen includes: calculating a division manner for a display image; and displaying different portions of the display image correspondingly on the main display regions and the frame display region according to the division manner.

Optionally, the calculating the division manner for the display image includes: invoking a system parameter interface function and obtaining a resolution of the main display regions; dividing the splicing screen into unit structures corresponding to the division manner according to the division manner, wherein each of the unit structures has a standard aspect ratio; and obtaining the division manner for images in the main display regions and the frame display region based on the number of the regions, an aspect ratio of the main display region and an aspect ratio of the frame display region.

Optionally, in a case that each of the splicing screen and the main display regions is a rectangle, the division manner for images includes an image resolution m×n of the frame display region, wherein values of the m and the n are calculated according to following formulas: in a case that the frame display region is a frame display region between two adjacent ones of the main display regions along a width direction of the splicing screen, the m is an integer and $$\frac{a\times Y}{b}-1\leq m\leq\frac{a\times Y}{b}+1,$$

the n is an integer and $$\frac{c\times(2\times d+Y)}{d}-1\leq n\leq\frac{c\times(2\times d+Y)}{d}+1,$$

wherein Y is a width of the frame display region in this case, and a unit of the width is millimeter. In a case that the frame display region is a frame display region between two adjacent ones of the main display regions along a length direction of the splicing screen, the m is an integer and $$\frac{a\times(Y+2\times b)}{b}-1\leq m\leq\frac{a\times(Y+2\times b)}{b}+1,$$

the n is an integer and $$\frac{c\times Y}{d}-1\leq n\leq\frac{c\times Y}{d}+1,$$

wherein a is a resolution of the display image along the length direction of the splicing screen divided by the number of the main display regions along the length direction of the splicing screen, b is a resolution of the main display region along the length direction of the splicing screen, c is a resolution of the display image along the width direction of the splicing screen divided by the number of the main display regions along the width direction of the splicing screen, and d is a resolution of the main display region along the width direction of the splicing screen.

Optionally, in a case that the frame display region includes an electroluminescent layer formed of light-emitting diode LEDs or an electroluminescent layer formed of organic light-emitting diode OLEDs, displaying different portions of the display image correspondingly on the main display regions and the frame display region according to the division manner includes: driving a corresponding one of the LEDs or the OLEDs by using a grayscale average of a matrix with a resolution X×X in a portion of the display image corresponding to the frame display region, wherein the X is an integer greater than 1, X=m/M=n/N, M×N is an actual pixel resolution of each of the LEDs or OLEDs, and each of the M and the N is a positive integer.

In a third aspect, the present disclosure provides a device for driving a splicing screen. The device is configured to drive the above splicing screen and includes an image capture module, configured to calculate a division manner for a display image; and an image division display module, configured to display different portions of the display image correspondingly on main display regions and a frame display region according to the division manner.

Optionally, the image capture module includes a resolution obtaining unit, configured to invoke a system parameter interface function and obtain a resolution of the main display regions; and an image division manner calculating unit, configured to obtain an image division manner for the main display regions and the frame display region based on a number of the regions, an aspect ratio of each of the main display regions and an aspect ratio of the frame display region.

Optionally, in a case that each of the splicing screen and the main display regions is a rectangle, the image division manner includes an image resolution m×n of the frame display region, wherein the m and the n are calculated according to a following formula: in a case that the frame display region is a frame display region between two of the main display regions along a width direction of the splicing screen, the m is an integer, $$\frac{a\times Y}{b}-1\leq m\leq\frac{a\times Y}{b}+1,$$

the n is an integer, and $$\frac{c\times(2\times d+Y)}{d}-1\leq n\leq\frac{c\times(2\times d+Y)}{d}+1,$$

where the Y is a width of the frame display region, and a unit of the width is millimeter; and in a case that the frame display region is a frame display region between two of the main display regions along a length direction of the splicing screen, the m is an integer, $$\frac{a\times(Y+2\times b)}{b}-1\leq m\leq\frac{a\times(Y+2\times b)}{b}+1,$$

the n is an integer, and $$\frac{c\times Y}{d}-1\leq n\leq\frac{c\times Y}{d}+1,$$

where a is a resolution of the display image along the length direction of the splicing screen divided by a number of the main display regions along the length direction of the splicing screen, b is a resolution of the main display region along the length direction of the splicing screen, c is a resolution of the display image along the width direction of the splicing screen divided by the number of the main display regions along the width direction of the splicing screen, and d is a resolution of the main display region along the width direction of the splicing screen.

Optionally, in a case that the frame display region includes an electroluminescent layer formed of light-emitting diodes LEDs, or an electroluminescent layer formed of organic light-emitting diode OLEDs, the image division display module is further configured to: drive a corresponding one of the LEDs or the OLEDs by using a grayscale average of a matrix with a resolution X×X in a portion of the display image corresponding to the frame display region, wherein the X is an integer greater than 1, X=m/M=n/N, M×N is an actual pixel resolution of each of the LEDs or OLEDs, and each of the M and the N is a positive integer.

In a fourth aspect, the present disclosure provides a display apparatus, which includes the above splicing screen.

Optionally, the display apparatus further includes the above device for driving the splicing screen.

DETAILED DESCRIPTION

To make technical problems to be solved, technical solutions and advantages of the present disclosure clearer, embodiments will be described in detail hereinafter in conjunction with drawings.

Figure 1:
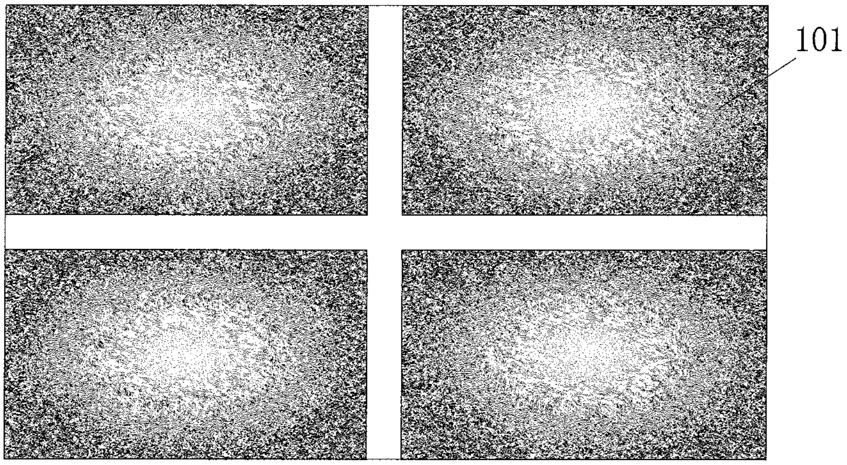
FIG. 1 is a schematic diagram of a division manner for display regions of a splicing screen in the related art.

FIG. 1 is a schematic diagram of a division manner for display regions of a splicing screen in the related art. FIG. 1 shows a 2×2 splicing screen, and the splicing screen includes two horizontal liquid crystal modules and two vertical liquid crystal modules. Since each of the liquid crystal modules inevitably includes a non-display region for driving-wires, a splicing gap region incapable of displaying an image inevitably occurs after the liquid crystal modules are assembled into a complete system.

The present disclosure provides a splicing screen. The splicing screen includes at least one main display region and a frame display region located around the at least one main display region. The at least one main display region is configured to display a first portion of a display image, and the frame display region is configured to display a second portion of the display image other than the first portion of the display image. In a case that more than two main display regions are arranged, the frame display region is located at a splicing gap between the main display regions.

In the splicing screen, the method and the device for drive the splicing screen, and the display apparatus according to the present disclosure, a display region of a display panel is taken as the main display regions, and a non-display region of the display panel is taken as the frame display region. In such a manner, in a case that the splicing screen is formed by two or more main display regions, the splicing gap between the main display regions may also display an image, such that continuity and integrity of the display image may be ensured and a display quality of the splicing screen is improved.

Figure 6A:
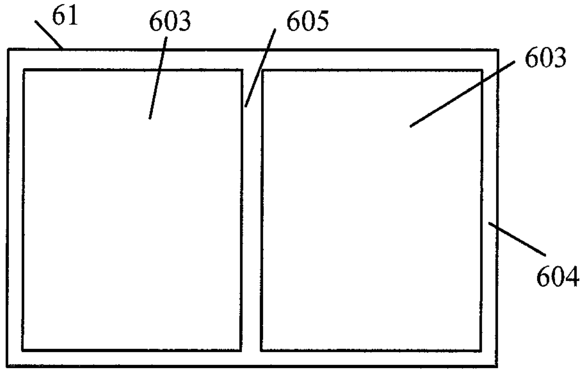
FIG. 6A is a distribution schematic diagram of main display regions and a frame display region of a splicing screen according to some embodiments of the present disclosure.

A splicing screen 61 shown in FIG. 6A includes two main display regions 603 and a frame display region, and the frame display region includes at least one portion of a frame 604 around the two main display regions 603, or the frame display region includes a splicing gap 605 between the two main display regions 603.

Figure 6B:
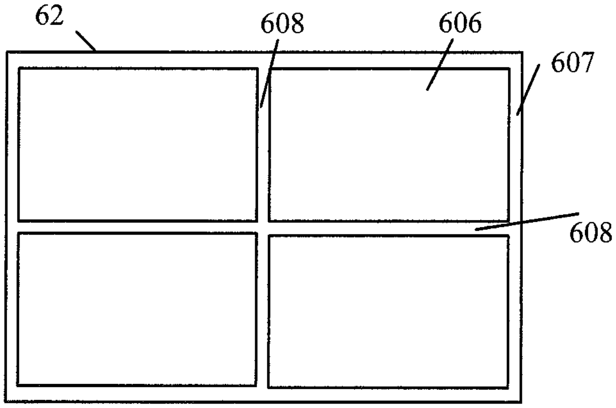
FIG. 6B is a distribution schematic diagram of main display regions and a frame display region of a splicing screen according to some embodiments of the present disclosure.

A splicing screen 62 shown in FIG. 6B includes at least four main display regions 606 and a frame display region, and the frame display region includes at least one portion of a frame 607 around the main display regions 606, or the frame display region includes a splicing gap 608 between the main display regions 606.

A frame between two main display regions of a splicing screen in the related art is an iron frame which may adversely affect light transmissivity, thus generating a black block region between the two main display regions. Since the frame display region of the splicing screen according to the present disclosure is capable of displaying an image, splicing gaps between a plurality of main display regions are also capable of displaying images in a case that the splicing screen is spliced by the main display regions, thereby ensuring display continuity of an entirety of the splicing screen and integrity of a display image, and improving the quality of the display image. Compared with a splicing screen in the related art, the splicing screen according to the present disclosure may weaken or eliminate influence of the gap between the main display regions.

Figure 4:
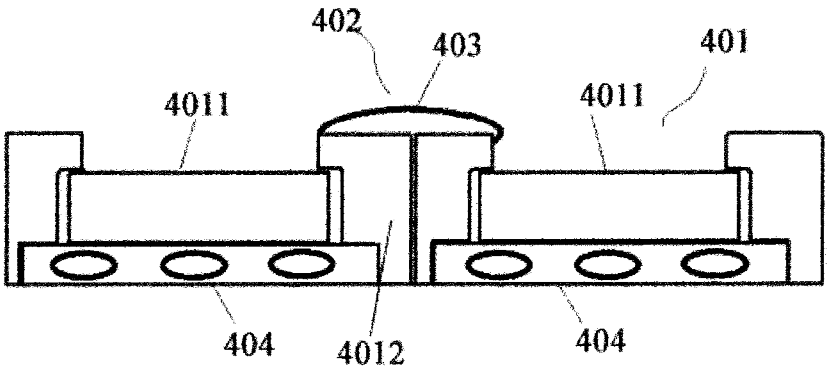
FIG. 4 is a structural schematic diagram of main display regions and a frame display region of a splicing screen according to some embodiments of the present disclosure.

In optional embodiments of the present disclosure, the frame display region includes a transparent frame and an electroluminescent layer arranged on a light-emission side of the transparent frame. Specifically, as shown in FIG. 4, each main display region 401 includes a first independent display panel 4011. In a case that the splicing screen includes a plurality of main display regions 401, a frame display region 402 located at a splicing gap between the main display regions 401 may also display an image, and thus the frame display region 402 and the main display regions 401 jointly display an image, thereby ensuring integrity and continuity of the image.

Specifically, the frame display region 402 includes at least one second independent display panel.

In some embodiments of the present disclosure, the number of the main display regions 401 is at least two, and the frame display region includes a splicing gap region between the at least two main display regions. Therefore, the splicing screen according to some embodiments of the present disclosure has a high image continuity and integrity, and may improve an image display effect as compared to a splicing screen in the related art.

In some embodiments of the present disclosure, each of the main display regions includes a backlight module and a display panel arranged at a light-emission side of the backlight module; and the frame display region includes a display panel and an electroluminescent layer arranged at a frame of the backlight module and proximate to the light-emission side of the backlight module.

The main display regions occupy most parts of the splicing screen, and use the display panels to display an image, thus ensuring image display quality of the main display regions. The electroluminescent layer and a corresponding driving circuit are used by the frame display region to display an image, thus saving energy and simplifying a structure of the splicing screen.

In some embodiments of the present disclosure, the backlight module is a straight-down-type backlight module. Specifically, the straight-down-type backlight module is an LED straight-down-type backlight module, a frame on edges of the main display regions is a transparent frame; the frame display region corresponds to a region of the transparent frame projected on the light-emission surface, is provided with the electroluminescent layer, and is configured to display image information to be displayed on the frame.

In some embodiments of the present disclosure, the electroluminescent layer is a layer formed of an organic light-emitting diode (OLED). As shown in FIG. 4, the frame 402 between the main display regions 401 is covered by a flexible OLED 403, and a cover region of the flexible OLED 403 corresponds to a non-display region between effective display regions of the backlight modules 404 of the main display regions 401, and a seamless splicing effect is implemented. Since the flexible OLED is thin, the flexible OLED may be adhered to the splicing gap through a transparent glue to cover the gap, thereby weakening the splicing gap.

Figure 5:
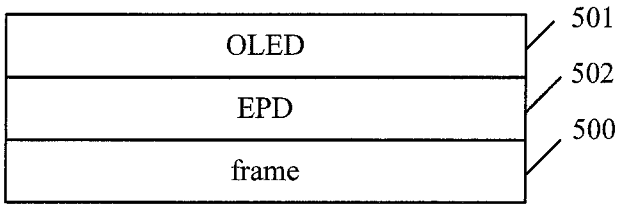
FIG. 5 is a structural schematic diagram of a frame display region according to some embodiments of the present disclosure.

FIG. 5 is a structural schematic diagram of a frame display region according to some embodiments of the present disclosure. The frame display region as shown in FIG. 5 is provided with OLEDs 501 and an E-Paper Display (EPD) 502. That is, the EPD 502 is adhered onto a frame region 500 between the main display regions, the OLEDs 501 are adhered above pixels corresponding to a display region of the EPD 502, and each pixel of the OLED 501 is a transparent pixel such that the EPD below the OLED 501 may display through the OLED 501. In a case that at least one of a black-and-white image and a static image is displayed on the splicing screen, the EPD 502 is used to save energy; and in a case that the splicing screen displays other images, the OLED 501 is used for display. The pixel corresponding to the OLED 501 is in an off state in a case that the EPD 502 is used for display, and thus, the EPD 502 may display through the pixels of the OLEDs 501.

Figure 2A:
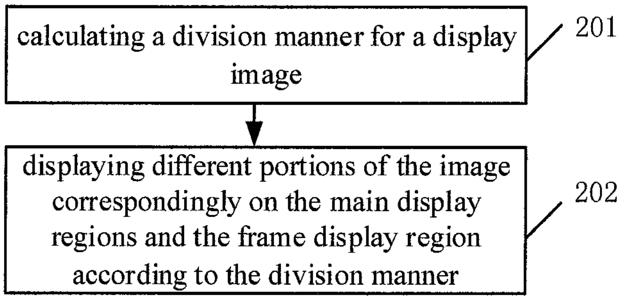
FIG. 2A is a flowchart of a method for driving a splicing screen according to some embodiments of the present disclosure.
Figure 2B:
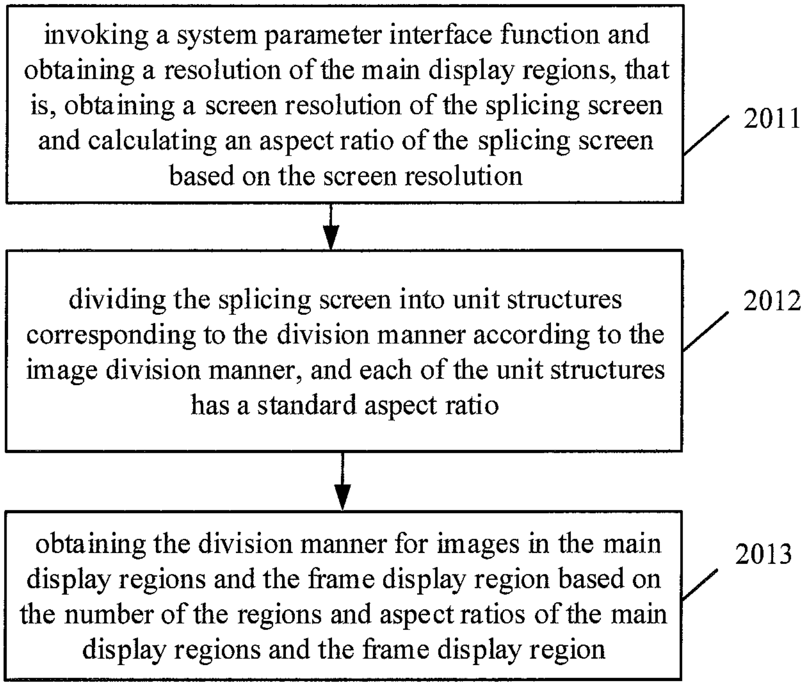
FIG. 2B is a detailed flowchart of one step in the method for driving a splicing screen as shown in FIG. 2A.

Further, the present disclosure provides a method for driving a splicing screen, and the method is used to drive the splicing screen provided in the embodiments of the present disclosure. As shown in FIG. 2, the method includes steps 201 and 202.

Step 201: calculating a division manner for a display image. The division manner for the display image includes a wide-screen image division manner and a standard-screen image division manner, the splicing screen is divided into unit structures including main display regions and a frame display region corresponding to the division manner according to the division manner, and each of the main display regions has a standard aspect ratio.

Step 202: displaying different portions of an image correspondingly on the main display regions and the frame display region according to the division manner. A data source of the image and corresponding representations of the display regions are received, the data source is displayed on the main display regions on the splicing screen corresponding to a representation of the main display regions and on the frame display region corresponding to a representation of the frame display region. When displaying data, if a resolution of the data source is different from a resolution of the unit structures of the splicing screen, the data source needs to be scaled. Specifically, according to a proportional relation between the resolution of the data source and a resolution of the main display regions or a resolution of the frame display region, the data source is scaled. The scaled data source is displayed on a corresponding rectangular unit. The resolution, i.e., a precision of the image, refers to the number of pixels capable of being displayed by a display panel. The data source is scaled to the resolution of the main display regions or the resolution of the frame display region, and then the scaled data source is displayed.

Since the resolution of the main display regions may be different from the resolution of the frame display region, the image needs to be divided when being displayed, a portion of the image divided for the main display regions is displayed on the main display regions, and the other portion of the image divided for the frame display region is displayed on the frame display region, so as to ensure that the portion of the image, an image display scale and an image quality of the main display regions may be approximate to those of the frame display region, thereby displaying a continuous and complete image on the splicing screen.

In some embodiments of the present disclosure, the calculating the division manner for the display image further includes: obtaining the division manner corresponding to the number of the main display regions, sizes of the main display regions, a size of the frame display region and an image resolution of the data source. The division manner may be calculated in advance, or calculated when inputting signals.

In some embodiments of the present disclosure, the calculating the division manner for the display image specifically includes steps 2011 to 2013.

Step 2011: invoking a system parameter interface function and obtaining a resolution of the main display regions, that is, obtaining a screen resolution of the splicing screen and calculating an aspect ratio of the splicing screen based on the screen resolution. The division manner includes a wide-screen image division manner and a standard-screen image division manner.

Step 2012: dividing the splicing screen into unit structures corresponding to the division manner according to the division manner. Each of the unit structures has a standard aspect ratio.

Step 2013: obtaining the division manner for images in the main display regions and the frame display region based on the number of the regions and aspect ratios of the main display regions and the frame display region.

In some embodiments of the present disclosure, when the splicing screen is a rectangle and each of the main display regions is also a rectangle, the division manner includes: an image resolution of the frame display region which is m×n, where values of the m and the n are calculated according to the following formulas.

In a case that the frame display region is between two adjacent main display regions along a width direction of the splicing screen, the m is an integer and $$\frac{a\times Y}{b}-1\leq m\leq\frac{a\times Y}{b}+1,$$

the n is an integer and $$\frac{c\times(2\times d+Y)}{d}-1\leq n\leq\frac{c\times(2\times d+Y)}{d}+1,$$

where Y is a width value of the frame display region, and a unit of the width is millimeter.

In a case that the frame display region is between two adjacent main display regions along a length direction of the splicing screen, the m is an integer and $$\frac{a\times(Y+2\times b)}{b}-1\leq m\leq\frac{a\times(Y+2\times b)}{b}+1,$$

n is an integer and $$\frac{c\times Y}{d}-1\leq n\leq\frac{c\times Y}{d}+1.$$

Wherein a is a resolution of the display image along the length direction of the splicing screen divided by the number of the main display regions along the length direction of the splicing screen, b is a resolution of the main display regions along the length direction of the splicing screen, c is a resolution of the display image along the width direction of the splicing screen divided by the number of the main display regions along the width direction of the splicing screen, and d is a resolution of the main display regions along the width direction of the splicing screen.

An example is given hereinafter that 2×2 main display regions are spliced by using display modules with a 1920×1080 resolution, to display an image with a 3840×2160 resolution. In the example, two main display regions are arranged along the length direction of the splicing screen and two main display regions are arranged along the width direction of the splicing screen. Each of the main display regions is provided with one display module, an active area (Active Area) of the display module is 1209.6 mm×680.4 mm; and the frame display region includes splicing gaps between the main display regions and a frame of the splicing screen, and a width of the frame display region is Y mm. It should be understood that, in the present disclosure, a value of Y may be set according to actual conditions, and thus does not limit the protection scope of the present disclosure.

After the 2×2 main display regions are spliced, the inputted image with the 3840×2160 resolution is divided into four data sources with the 1920×1080 resolution, which are inputted into the display modules corresponding to the main display regions, respectively.

A pixel width of the frame display region is adjusted manually or automatically by the splicing screen, and the pixel width is theoretically equal to a width of the splicing gap between the main display regions and a width of the frame of the splicing screen. A resolution of the image captured between two adjacent display modules is recorded as m×n, and the values of the m and the n are calculated as follow.

When the captured image is an image displayed on the frame display region between two horizontally-adjacent main display regions such as a left main display region and a right main display region, i.e., when m<n, $$m \text{ is an integer and } \frac{1920\times Y}{1209.6} - 1 \le m \le \frac{1920\times Y}{1209.6} + 1;$$

$$n \text{ is an integer and } \frac{1080\times(2\times680.4+Y)}{680.4} - 1 \le n \le \frac{1080\times(2\times680.4+Y)}{680.4} + 1;$$

and

When the captured image is an image displayed on the frame display region between two vertically-adjacent main display regions of the splicing screen such as an upper main display region and a lower main display region, i.e., when n<m, $$m \text{ is an integer and } \frac{1920\times(Y+2\times1209.6)}{1209.6} - 1 \le m \le \frac{1920\times(Y+2\times1209.6)}{1209.6} + 1;$$

$$n \text{ is an integer and } \frac{1080\times Y}{680.4} - 1 \le n \le \frac{1080\times Y}{680.4} + 1.$$

In the embodiments of the present disclosure, the OLED is used for display in the frame display region, and after calculating the values of the m and the n, the image is divided according to the following method, and the divided image is displayed on the frame display region.

An actual pixel resolution of the OLED in the splicing gap between two adjacent main display regions is M×N, it is satisfied that m/M=n/N=X (X is an integer greater than or equal to 1), and each of M and N is a positive integer; a backlight source driving circuit performs display in a driving manner that one unit of the image resolution corresponds to an average of grayscales of every X×X actual OLED pixels.

A resolution of the image captured for display on the frame display region between two adjacent display modules is m×n. 3m×n subpixels are needed for display when the image is displayed on the display modules. Specifically, an average of grayscales of a first to a $X^{th}$ red subpixels in a first to a $X^{th}$ rows is displayed through a red pixel in a first row and a first column on an OLED array; an average of grayscales of a first to a $X^{th}$ green subpixels in the first to the $X^{th}$ rows is displayed through a green pixel in the first row and a second column on the OLED array; an average of grayscales of a first to a $X^{th}$ blue subpixels in the first to the $X^{th}$ rows is displayed through a blue pixel in the first row and a third column on the OLED array; . . . ; an average of grayscales of a first to a $X^{th}$ red subpixels in a $(n-X+1)^{th}$ to a $n^{th}$ rows is displayed through a red pixel in a $N^{th}$ row and the first column on the OLED array; an average of grayscales of a first to a $X^{th}$ green subpixels in the $(n-X+1)^{th}$ to the $n^{th}$ rows is displayed through a green pixel in the $N^{th}$ row and the second column on the OLED array; and an average of grayscales of a first to a $X^{th}$ blue subpixels in the $(n-X+1)^{th}$ to the $n^{th}$ rows is displayed through a blue pixel in the $N^{th}$ row and the third column on the OLED array.

Figure 3A:
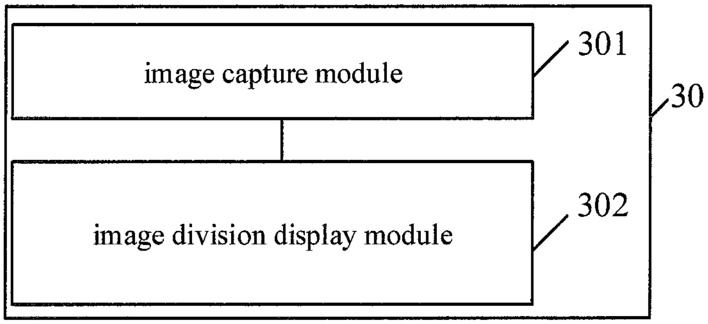
FIG. 3A is a structural schematic diagram of a device for driving a splicing screen according to some embodiments of the present disclosure.

In addition, the present disclosure further provides a device 30 for driving a splicing screen, which is used to drive the splicing screen according to the embodiments of the present disclosure. As shown in FIG. 3A, the device 30 for driving the splicing screen includes an image capture module 301 and an image division display module 302. The image capture module 301 is configured to calculate a division manner for a display image, and the image division display module 302 is configured to display different portions of the image correspondingly on main display regions and a frame display region according to the division manner.

Figure 3B:
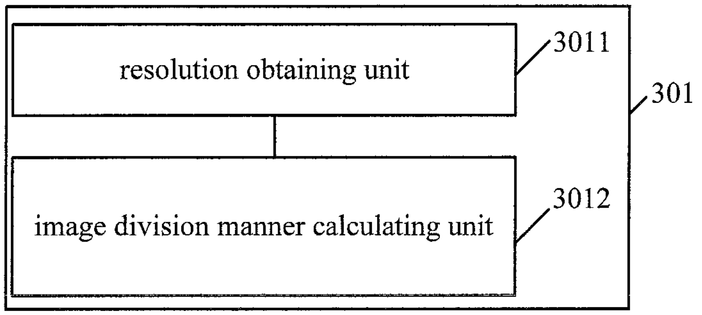
FIG. 3B is a structural schematic diagram of an image capture module as shown in FIG. 3A.
Figure 3C:
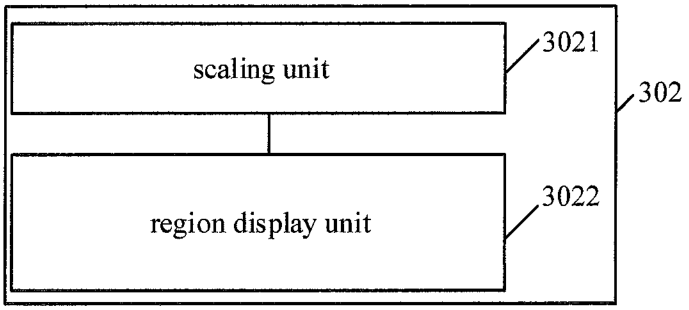
FIG. 3C is a structural schematic diagram of an image division display module as shown in FIG. 3A.

In some embodiments of the present disclosure, as shown in FIG. 3B, the image capture module 301 includes a resolution obtaining unit 3011 and an image division manner calculating unit 3012. The resolution obtaining unit 3011 is configured to invoke a system parameter interface function and obtain a resolution of the main display regions, that is, obtain a screen resolution of a splicing screen and calculate an aspect ratio of the splicing screen based on the screen resolution. The image division manner calculating unit 3012 is configured to: obtain a division manner for images of the main display regions and the frame display region based on the number of spliced regions and aspect ratios of the main display regions and the frame display region; and calculate a division manner of the regions according to the image division manner and divide the image into a plurality of rectangle images. The rectangle images correspond to the main display regions and the frame display regions, respectively, and a length-width ratio of each of the rectangles is a display scale of the rectangle.

The image division display module 302 further includes a scale unit 3021 and a region display unit 3022. The scale unit 3021 is configured to scale the image based on a display scale in a case that a resolution of the data source is different from a resolution of the unit structures, and to transmit the scaled data source to corresponding display regions, respectively. The region display unit 3022 is configured to display the scaled image correspondingly on the main display regions and the frame display region.

In the embodiments of the present disclosure, a corresponding image division manner is obtained according to the numbers and the aspects ratios of the main display regions and the frame display region, the splicing screen is divided into a plurality of rectangles according to the division manner for the image, the plurality of rectangles correspond to the main display regions and the frame display regions, respectively, and each of the rectangles has a standard aspect ratio. In such a manner, the splicing screen is divided self-adaptively based on the screen resolution, and whether the splicing screen is a standard screen or a bar-shape splicing screen, the image may be displayed to be adaptive to a proportion of the splicing screen, and a better display effect may be implemented.

In the embodiments of the present disclosure, in a case that the splicing screen and the main display regions are rectangles, the division manner for the image includes: an image resolution m×n of the frame display region, wherein values of the m and the n are calculated according to the following formulas.

In a case that the frame display region is between two adjacent main display regions along a width direction of the splicing screen, the m is an integer and $$\frac{a\times Y}{b}-1\leq m\leq\frac{a\times Y}{b}+1,$$

the n is an integer and $$\frac{c\times(2\times d+Y)}{d}-1\leq n\leq\frac{c\times(2\times d+Y)}{d}+1,$$

where Y is a width value of the frame display region, and a unit of the width is millimeter.

In a case that the frame display region is between two adjacent main display regions along a length direction of the splicing screen, the m is an integer and $$\frac{a\times(Y+2\times b)}{b}-1\leq m\leq\frac{a\times(Y+2\times b)}{b}+1,$$

n is an integer and $$\frac{c\times Y}{d}-1\leq n\leq\frac{c\times Y}{d}+1.$$

Wherein a is a resolution of the display image along the length direction of the splicing screen divided by the number of the main display regions along the length direction of the splicing screen, b is a resolution of the main display regions along the length direction of the splicing screen, c is a resolution of the display image along the width direction of the splicing screen divided by the number of the main display regions along the width direction of the splicing screen, and d is a resolution of the main display regions along the width direction of the splicing screen.

In addition, the present disclosure further provides a display apparatus, which includes the splicing screen according to the embodiments of the present disclosure.

In some embodiments of the present disclosure, the display apparatus further includes the device for driving the splicing screen according to the embodiments of the present disclosure.

It may be seen from the above that, in the splicing screen, the method and the device for driving the splicing screen and the display apparatus including the splicing screen and the device for driving the splicing screen according to the present disclosure, a display region of a display panel is used as the main display regions, and a non-display region of the display panel is used as the frame display region. In such a manner, in a case that the splicing screen is spliced by two or more main display regions, the splicing gap between the main display regions may also display an image, thus ensuring continuity and integrity of the display image, and improving display quality of the splicing screen.

It should be understood that the embodiments described above are merely for illustration and explanation of the present disclosure, but are not to limit the present disclosure. In a case of no conflict, the embodiments of the present disclosure and features in the embodiments may be combined with each other. Obviously, those skilled in the art can make various modifications and variations to the present disclosure without departing from the spirit and scope of the present disclosure. In such a manner, if these modifications and variations of the present disclosure fall within the scope of claims and equivalent technologies of the present disclosure, it is also intended that the present disclosure includes these modifications and variations.

What is claimed is:

1. A splicing screen, comprising:

a plurality of main display regions, configured to display a first portion of a display image; and a frame display region at edges of the plurality of main display regions and at splicing gaps between adjacent ones of the plurality of main display regions, the frame display region being configured to display a second portion of the display image other than the first portion of the display image, wherein the frame display region comprises a transparent frame and an electroluminescent layer on a light-emission side of the transparent frame, the frame display region further comprises an electronic paper display EPD between the transparent frame and the electroluminescent layer, and the electroluminescent layer is transparent such that the electronic paper display is capable of displaying through the electroluminescent layer, in a case that the splicing screen displays at least one of a black-and-white image and a static image, the EPD is used for display; and in a case that the splicing screen displays an image other than the black-and-white image and the static image, the electroluminescent layer is used for display.

2. The splicing screen according to claim 1, wherein an entirety of a contact surface between the electroluminescent layer and the transparent frame is in a plane parallel to a plane of the plurality of the plurality of main display regions.

3. The splicing screen according to claim 1, wherein each of the main display regions comprises:

a backlight; and a display panel on a light-emission side of the backlight, wherein the backlight is a straight-down-type backlight.

4. The splicing screen according to claim 1, wherein the electroluminescent layer is a flexible organic light-emitting diode OLED layer or a flexible light-emitting diode LED layer.

5. The splicing screen according to claim 4, wherein the electroluminescent layer is adhered to the transparent frame by means of a transparent glue.

6. A method for driving a splicing screen, the method being used to drive the splicing screen according to claim 1 and comprising:

calculating a division manner for a display image; and displaying different portions of the display image correspondingly on the main display regions and the frame display region according to the division manner.

7. The method for driving a splicing screen according to claim 6, wherein the calculating the division manner for the display image comprises:

invoking a system parameter interface function and obtaining a resolution of the main display regions;

dividing the splicing screen into unit structures corresponding to the division manner according to the division manner, wherein each of the unit structures has a standard aspect ratio; and obtaining the division manner for images in the main display regions and the frame display region based on a number of the regions, an aspect ratio of the main display regions and an aspect ratio of the frame display region.

8. The method for driving a splicing screen according to claim 7, wherein in a case that each of the splicing screen and the main display regions is a rectangle, the division manner for images comprises an image resolution m×n of the frame display region, wherein values of the m and the n are calculated according to following formulas:

in a case that the frame display region is a frame display region between two adjacent ones of the main display regions along a width direction of the splicing screen, the m is an integer and $$\frac{a\times Y}{b}-1\leq m\leq\frac{a\times Y}{b}+1,$$

the n is an integer and $$\frac{c\times(2\times d+Y)}{d}-1\leq n\leq\frac{c\times(2\times d+Y)}{d}+1,$$

wherein Y is a width of the frame display region in this case, and a unit of the width is millimeter; and in a case that the frame display region is a frame display region between two adjacent ones of the main display regions along a length direction of the splicing screen, the m is an integer and $$\frac{a\times(Y+2\times b)}{b}-1\leq m\leq\frac{a\times(Y+2\times b)}{b}+1,$$

the n is an integer and $$\frac{c\times Y}{d}-1\leq n\leq\frac{c\times Y}{d}+1,$$

wherein a is a resolution of the display image along the length direction of the splicing screen divided by the number of the main display regions along the length direction of the splicing screen, b is a resolution of the main display region along the length direction of the splicing screen, c is a resolution of the display image along the width direction of the splicing screen divided by the number of the main display regions along the width direction of the splicing screen, and d is a resolution of the main display region along the width direction of the splicing screen.

9. The method for driving a splicing screen according to claim 6, wherein in a case that the frame display region comprises an electroluminescent layer formed of light-emitting diode LEDs or an electroluminescent layer formed of organic light-emitting diode OLEDs, displaying different portions of the display image correspondingly on the main display regions and the frame display region according to the division manner comprises:

driving a corresponding one of the LEDs or the OLEDs by using a grayscale average of a matrix with a resolution X×X in a portion of the display image corresponding to the frame display region, wherein the X is an integer greater than 1, X=m/M=n/N, M×N is an actual pixel resolution of each of the LEDs or OLEDs, and each of the M and the N is a positive integer.

10. A device for driving a splicing screen, the device being configured to drive the splicing screen according to claim 1 and comprising:

an image capture circuit, configured to calculate a division manner for a display image; and an image division display circuit, configured to display different portions of the display image correspondingly on main display regions and a frame display region according to the division manner.

11. The device for driving a splicing screen according to claim 10, wherein the image capture circuit comprises:

a resolution obtaining sub-circuit, configured to invoke a system parameter interface function and obtain a resolution of the main display regions; and an image division manner calculating sub-circuit, configured to obtain an image division manner for the main display regions and the frame display region based on a number of the regions, an aspect ratio of each of the main display regions and an aspect ratio of the frame display region.

12. The device for driving a splicing screen according to claim 10, wherein in a case that each of the splicing screen and the main display regions is a rectangle, the image division manner comprises an image resolution m×n of the frame display region, wherein the m and the n are calculated according to a following formula:

in a case that the frame display region is a frame display region between two of the main display regions along a width direction of the splicing screen, the m is an integer, $$\frac{a\times Y}{b}-1\leq m\leq\frac{a\times Y}{b}+1,$$

the n is an integer, and $$\frac{c\times(2\times d+Y)}{d}-1\leq n\leq\frac{c\times(2\times d+Y)}{d}+1,$$

where the Y is a width of the frame display region, and a unit of the width is millimeter; and in a case that the frame display region is a frame display region between two of the main display regions along a length direction of the splicing screen, the m is an integer, $$\frac{a\times(Y+2\times b)}{b}-1\leq m\leq\frac{a\times(Y+2\times b)}{b}+1,$$

the n is an integer, and $$\frac{c\times Y}{d}-1\leq n\leq\frac{c\times Y}{d}+1,$$

where a is a resolution of the display image along the length direction of the splicing screen divided by a number of the main display regions along the length direction of the splicing screen, b is a resolution of the main display region along the length direction of the splicing screen, c is a resolution of the display image along the width direction of the splicing screen divided by the number of the main display regions along the width direction of the splicing screen, and d is a resolution of the main display region along the width direction of the splicing screen.

13. The device for driving a splicing screen according to claim 10, wherein in a case that the frame display region comprises an electroluminescent layer formed of light-emitting diodes LEDs, or an electroluminescent layer formed of organic light-emitting diode OLEDs, the image division display circuit is further configured to:

drive a corresponding one of the LEDs or the OLEDs by using a grayscale average of a matrix with a resolution $X \times X$ in a portion of the display image corresponding to the frame display region, wherein the X is an integer greater than 1, $X=m/M=n/N$, $M \times N$ is an actual pixel resolution of each of the LEDs or OLEDs, and each of the M and the N is a positive integer.

14. A display apparatus, comprising:

the splicing screen according to claim 1.

15. The display apparatus according to claim 14, further comprising:

the device for driving a splicing screen according to claim 10.

16. A device for driving a splicing screen, the device being configured to drive the splicing screen according to claim 2 and comprising:

an image capture circuit, configured to calculate a division manner for a display image; and an image division display circuit, configured to display different portions of the display image correspondingly on main display regions and a frame display region according to the division manner.

17. A method for driving a splicing screen, the method being used to drive the splicing screen according to claim 2 and comprising:

calculating a division manner for a display image; and displaying different portions of the display image correspondingly on the main display regions and the frame display region according to the division manner.

18. A device for driving a splicing screen, the device being configured to drive the splicing screen according to claim 3 and comprising:

an image capture circuit, configured to calculate a division manner for a display image; and an image division display circuit, configured to display different portions of the display image correspondingly on main display regions and a frame display region according to the division manner.

* * * * *